United States Patent
Tamir et al.

(10) Patent No.: US 6,438,508 B2
(45) Date of Patent: Aug. 20, 2002

(54) VIRTUAL STUDIO POSITION SENSING SYSTEM

(75) Inventors: Michael Tamir, Tel-Aviv; Avi Sharir, Ramat Hasharon, both of (IL)

(73) Assignee: Orad Hi-Tec Systems, Ltd., Kfar Sabb (IL)

( * ) Notice: Subject to any disclaimer, the term of this patent is extended or adjusted under 35 U.S.C. 154(b) by 0 days.

(21) Appl. No.: 09/736,996

(22) Filed: Dec. 14, 2000

Related U.S. Application Data

(62) Division of application No. 09/015,196, filed on Jan. 29, 1998, now Pat. No. 6,201,579.

(30) Foreign Application Priority Data

Feb. 1, 1997 (GB) .............................................. 9702636

(51) Int. Cl.[7] .............................................. H04N 5/265
(52) U.S. Cl. ........................ 702/153; 702/152; 348/584
(58) Field of Search ................................. 702/150–153, 702/94, 95, 57, 127, 183, 189, 190, 197, FOR 103, FOR 104, FOR 131, FOR 141, FOR 144, FOR 164, FOR 170, FOR 171; 348/584, 586–593, 598–600, 240, 505, 169–172, 574, 139, 722, 140, 700, 94, 95, 87

(56) References Cited

U.S. PATENT DOCUMENTS

| | | | |
|---|---|---|---|
| 3,914,540 A | 10/1975 | Slater | 348/211 |
| 4,769,707 A | 9/1988 | Kamise | 348/620 |
| 5,502,482 A | 3/1996 | Graham | 348/140 |
| 5,668,629 A | 9/1997 | Parker | 356/139.05 |
| 5,889,550 A | * 3/1999 | Reynolds | 348/139 |
| 5,912,700 A | * 6/1999 | Honey et al. | 348/169 |
| 6,020,931 A | * 2/2000 | Bilbrey et al. | 348/584 |
| 6,034,740 A | 3/2000 | Mitsui | 348/587 |
| 6,072,537 A | 6/2000 | Gurner | 348/586 |
| 6,122,013 A | * 9/2000 | Tamir et al. | 348/587 |

FOREIGN PATENT DOCUMENTS

| | | |
|---|---|---|
| WO | WO94/05118 | 3/1994 |
| WO | WO96/32697 | 10/1996 |
| WO | WO98/34410 | 8/1998 |

OTHER PUBLICATIONS

F. Sommerhauser, "Das Virtuelle Studio," *Fernseh–Und Kino–Technik*, 50:11–22, Jan. 1996 (translation of section 6 only).

M. Rotthaler, "Virtual Studio Technology," *EBU Technical Review*, pp. 2–6, Summer 1996.

\* cited by examiner

*Primary Examiner*—Hal Wachsman
(74) *Attorney, Agent, or Firm*—Fish & Richardson P.C.

(57) ABSTRACT

A position detecting device for an object within virtual set comprises providing the object with an emitting device and using the device in conjunction with a plain or patterned chroma-key background to provide the exact position of a TV camera or alone to provide a position for another object or actor.

16 Claims, 4 Drawing Sheets

VIRTUAL STUDIO POSITION SENSING SYSTEM

CROSS-REFERENCES TO RELATED APPLICATIONS

This application is a division of U.S. Ser. No. 09/015,196, filed Jan. 29, 1998, now U.S. Pat. No. 6,201,579.

The present invention relates to a virtual studio and in particular to a position sensing system for such a studio.

In virtual studio systems a chroma-key background is provided in front of which an actor stands. In the TV picture seen by the viewer the chroma-key background is replaced by a virtual scene. Such a system is described in PCT Patent Application No. WO95/30312 to the present applicant.

In the above known system the position of the camera is calculable by using a coded pattern on the chroma-key background. This enables the position of the camera, as well as its orientation and the lens zoom, to be continuously calculated and thereby the perspective of the virtual 3D set can be adjusted correctly to suit the camera position.

This works perfectly for cameras which have a fixed focus and zoom or a fixed position but problems can be encountered in situations where the cameraman is free to simultaneously change the camera position and the lens zoom. For example, when the camera's optical axis is perpendicular (or almost perpendicular) to the patterned wall, the changes in the captured pattern due to zooming of the lens or to changing the distance of the camera from the wall are identical (or almost identical) and the system cannot extract the correct solution from the captured pattern.

In order to overcome this problem in the present invention, the camera is provided with an independent means for indicating the position of the camera which means are used either alone or in conjunction with the coded pattern and the pattern recognition apparatus to ensure correct interpretation of the position of the camera.

The present invention therefore provides a virtual studio positioning system comprising a chroma-key background panel, a television camera situated in a defined front studio area in front of the background panel for imaging a foreground object in front of the background panel, at least one fixed mounted detection unit the fixed detection unit having a field of view to cover the defined front studio area, an emitting device mounted in a fixed relationship with respect to the TV camera or foreground object the fixed detection unit receiving emissions from the emitting device, and producing a detection output signal, processing means for processing the detection output signal of the fixed detection unit to provide at least x and y coordinates for the TV camera or foreground object in relation to a given origin position in the studio area.

This assumes that the emitting device is in a fixed and known height defining its z value. Preferably the chroma-key background panel comprises a coded chroma-key panel and includes further processing means for processing data extracted from the coded chroma-key panel.

The position information derived from the invention is then used, with the information derived from the pattern recognition system to calculate the accurate perspective information for the background.

Preferably the emitting device is an LED, preferably operating in the non visible part of the electromagnetic spectrum. Preferably the fixed detection device is a static camera, also preferably sensitive to the non visible part of the electromagnetic spectrum region. Preferably both LED and camera operate in the near infra-red.

Preferably the LED is not on continuously but is switched on for a defined time period.

In a specific embodiment the LED emission is coded to provide better distinction from background noise and emission of other LED's.

Preferably the detection device is also gated to receive emissions during a further defined period which is synchronous to the defined time period.

Preferably the defined time period is shorter than the further defined time period and both periods are synchronised to the frame synchronisation of the studio equipment.

Preferably in a specific embodiment the LED is active for a period of approximately 200 $\mu$sec and the detection device for a period of 100 $\mu$sec. Preferably the fixed mounted detection unit is mounted at a height above the background panel.

In a further embodiment for a case in which the height of the emitting device is not fixed, a second fixed mounted detection unit is provided.

The invention also then provides means for triangulating the positions given by the first and second detection units to determine the x, y and z positions of the studio camera or the foreground object.

The invention also provides a position sensing system for a TV studio, the system comprising an emission device mounted on an object in a defined area, detection means to detect the radiation emitted by the emission device and providing an output signal, processing means for processing the output signal of the detection means to provide an x,y positional map of the object within the defined area provided that the emission device is in a fixed and known height.

Preferably, the emission device emits radiation within the near infra-red.

Preferably the emission device emits non-continuous radiation only in pulses of defined width.

Preferably the detection means is provided with spectral filter means to collect only radiation in the emission spectrum of the emission device and also with temporal filter means to collect radiation only within a defined time period, the time period being synchronised to the pulse output of the emission device.

In a preferred embodiment for a case in which the height of the emitting device is not fixed, a second detection means is provided having a second output signal, the first and second output signals being used to define the position of the object in the x, y and z directions.

In a further preferred embodiment the positioning system for the studio comprises a position sensing system for a TV studio further comprising a defined structure of at least three LED's positioned in a fixed relationship with respect to the camera to enable calculation of all camera parameters (x,y,z pan, tilt and roll) and further including a zoom-focus sensor attached to the camera, the system enabling the use of uni-color background panel for displaying a virtual background.

In an alternative embodiment the zoom-focus can be provided from a coded chroma-key panel.

Embodiments of the present invention will now be described, by way of example with reference to the accompanying drawings in which.

Figure 1:
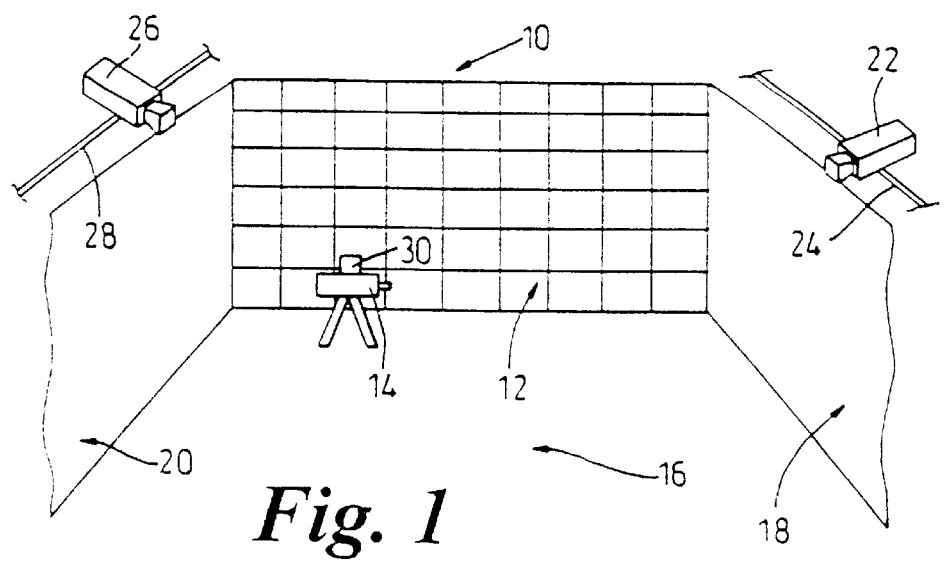
FIG. 1 shows schematically a television studio incorporating a virtual studio positioning system according to the present invention.

With reference now to FIG. 1, the system comprises a virtual studio system hereinafter referred to as a virtual set.

The virtual set 10 comprises a patterned chroma-key background panel 12 and a TV camera 14 situated in front of the panel 12 in a defined area generally designated at 16. Side chroma-key panels 18,20 are also present in a preferred embodiment.

An additional fixed mounted camera 22 is mounted preferably above side panel 18 on a mounting bar or rail 24 which rail may also be used to support panel 18 or the studio lighting. The field of view of camera 22 will comprise at least the designated floor area 16 and the vertical distance that camera 14 may rise above this area.

In a preferred embodiment the camera 22 is a black and white camera since a colour camera is not required for this system.

In a further embodiment a second camera 26, preferably of the same type as camera 22, is mounted on the opposite side area 16 also on a mounting rail 28 which can also be used to support panel 20 or the lighting. The camera arrangements are shown in greater detail in FIG. 1C.

Figure 1A:
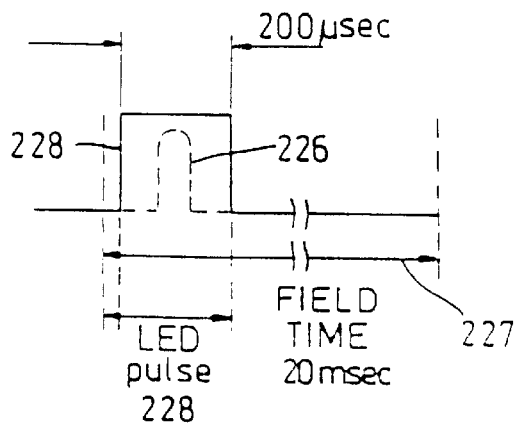
FIG. 1A shows a pulse timing diagram for the system of FIG. 1.
Figure 1B:
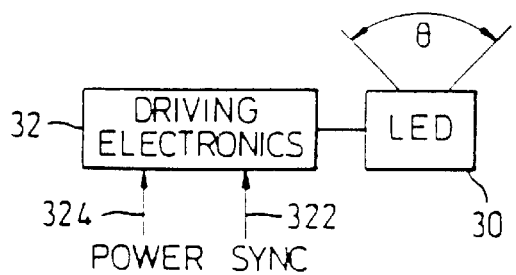
FIG. 1B illustrates diagrammatically the arrangement of the LED of FIG. 1.

Mounted in a fixed relationship to camera 14 is an LED device 30 which is shown in greater detail in FIG. 1B. LED 30 is driven by driving electronics 32. The driving electronics cause LED 30 to be switched on in a pulsed manner (see also FIG. 1A) in synchronism with the studio equipment. For this purpose the driving electronics is supplied with a sync pulse on input 322 and power on input 324. LED 30 must have a wide angle θ of radiation and preferably θ is equal to 180°. Preferably LED 30 radiates in the non visible part of the electromagnetic spectrum typically for example in the near infra-red and therefore does not provide any visible output.

The output emission of the LED 30 can be coded so that the system can locate and identify the (or each—see later description) emitting LED and also to provide more robustness to the detection system from background reflection.

Figure 1C:
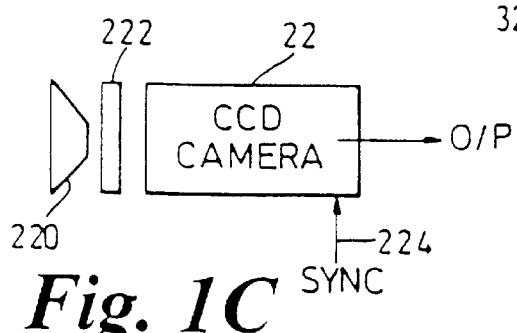
FIG. 1C shows diagrammatically the camera arrangement for the fixed camera of FIG. 1.

With reference now to FIGS. 1A and 1C, camera 22 is provided with a wide field lens 220 and with a spectral filter 222 which filters out visible light but allows through the near infra-red radiation from LED 30. Camera 22 is further provided with a temporal filter by also operating in synchronism with the studio synchronisation using a sync input 224 and an internal electronic shutter. The output of camera 22 is fed to the video analysis unit of FIG. 2.

As shown in FIG. 1A, the camera 22 is effectively gated by pulse 226 which is positioned to ensure capture of the radiation pulse 228 received from LED 30. Thus camera 22 receives the LED pulse and does not collect most of the ambient illumination that is continuous. Thus although other objects within area 16 with emit or reflect infra-red radiation, the pulse of output infra-red radiation from LED 30 will be able to be detected since the camera 22 will not be saturated by the ambient infra-red radiation emitted or reflected from other objects.

In a particular embodiment gating pulse 226 is only 100 μsec long compared with a field time 227 of 20 msec and the LED pulse of 200 μsec or more preferably 140 μsec.

The second camera 26 will operate in substantially the same manner as camera 22.

Figure 2:
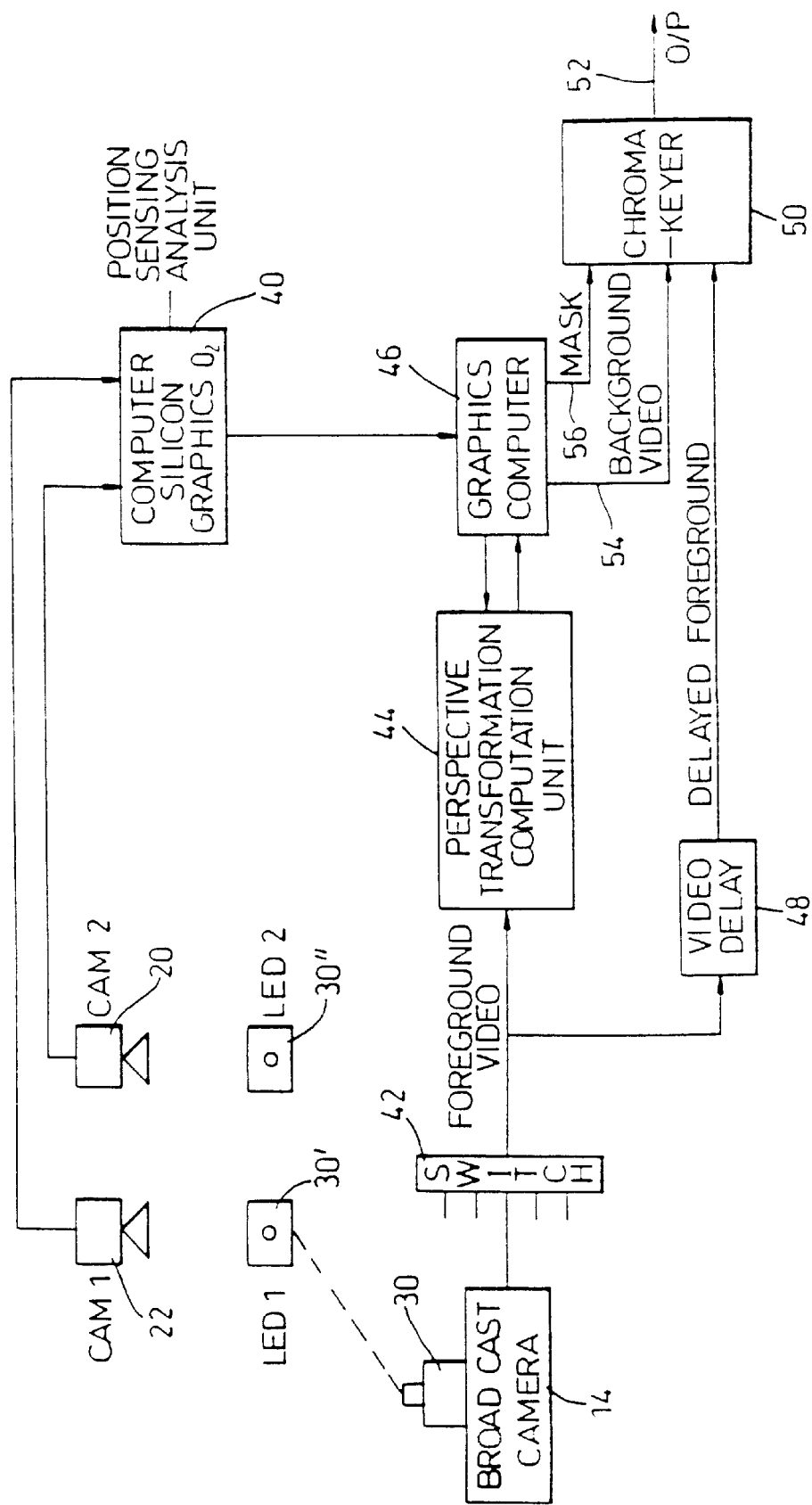
FIG. 2 shows in block diagrammatic form circuitry for the system of FIG. 1.

With reference to FIG. 2 the output of each camera 22, 26 is fed to a video analysis unit 40 which may be a computer, for example, the Silicon Graphics $O_2$.

Reference is hereby made to co-pending PCT Application No. US95/05324, issued as European Patent No. 0758515 B1 on Dec. 23, 1998 in which the operation of the pattern recognition apparatus is described.

The output of camera 14 is fed via a video switcher 42 (which enables several cameras to be used) to a perspective transformation computation unit 44, the operation of which is described in the above co-pending US PCT application. The output of this unit is fed to a graphics computer 46 where it is combined with the output of the position sensing analysis unit 40. By using the output of unit 40 to constrain the calculation done at unit 44 an accurate perspective transformation for the background is now extracted (see also FIG. 3).

The foreground video from camera 14 is also transmitted via a delay 48 to a chroma-keyer 50, the output 52 of which comprises the composed background and foreground TV picture.

To achieve this the foreground from delay 48 is combined with the background video 54 obtained by rendering the 3D virtual set from the calculated viewpoint at the graphical computer 46. The second video output from the graphics computer is a mask 56 telling the chroma-keyer where, in a "non-blue" pixel, it should "protect" the background.

Figure 3:
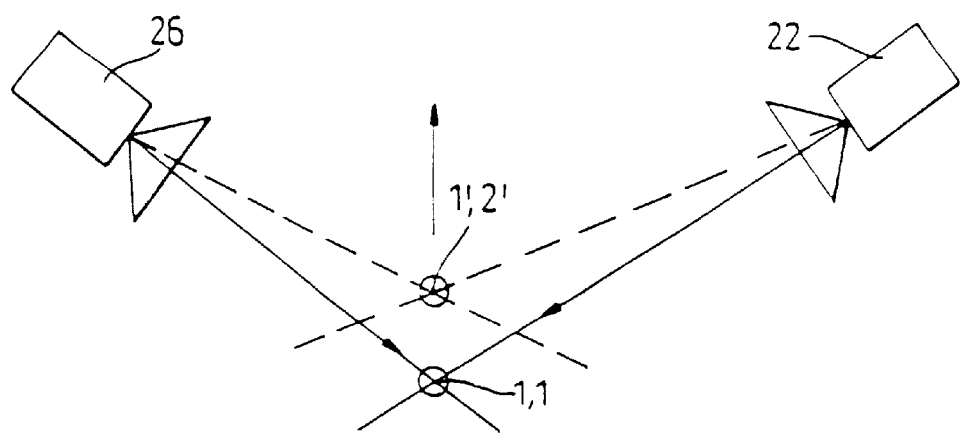
FIG. 3 illustrates the 3D positioning system.
Figure 4A:
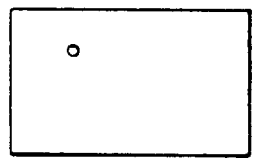
FIGS. 4A and 4B illustrate the output of the two cameras in FIG. 3 illustrating the 3D system of the present invention.
Figure 4B:
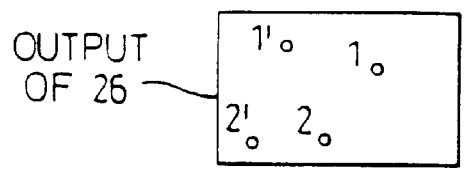
Figure 4B:
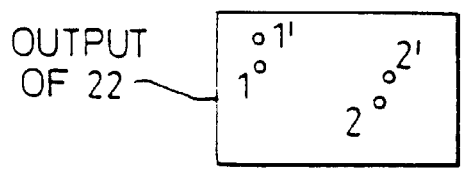

With reference to FIG. 3, by using both cameras 22 and 26 the x and y position of camera 14 can be determined together with and the height 2 of the camera above the floor. This can be seen from FIGS. 4A,4B. In FIG. 4A only one camera 22 is used which provides a single spot of light giving the x,y position of camera 14 (in case z value is fixed and known). In FIG. 4B there are two spots 1 and 2. If camera 14 rises then the two spots, will be 1' and 2' as shown in FIG. 3 and FIG. 4B. Thus by triangulation the x,y position and the height of the camera 14 can be obtained in position sensing analysis unit 40 and this information used to constrain the perspective transformation calculation in 44.

In case there is more than one LED, the separate spots in the camera output are identified using one of two methods (or both simultaneously):

1. Manual identification of each spot during system setup and then continuously video tracking each spot.
2. Assigning an on/off temporal code to each LED, for example, when there are two LEDs one code can be [1111], the second [1110].

In FIG. 2 two LED's 30' and 30" are shown. In a possible further embodiment each camera could be equipped with two or more LED's arranged in a known pattern. Providing these LED's are sufficiently far apart to enable separate detections by camera 22, further information about camera 14 can be obtained. For example, if a structure of 4 LED's is used, and each LED can be identified as described above, all studio camera position orientation and lens zoom parameters may be directly extracted knowing the LED's structure model.

Such an array of LED's may comprise several, e.g. 6 arranged in a circle each being sequentially activated.

The object 14 need not necessarily be a TV camera but could be an actor whose position may be required to be monitored as a depth key for a 3D virtual studio.

Figure 5:
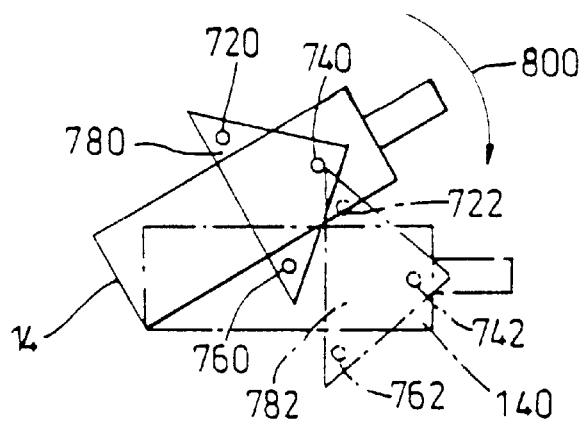
FIG. 5 shows a TV camera illustrating the calculation of panning movement.
Figure 6:
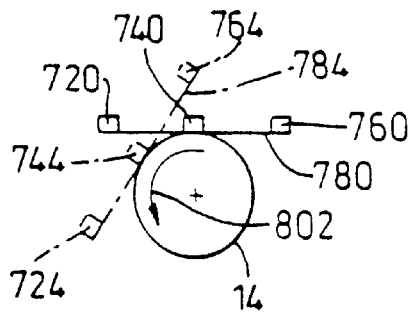
FIG. 6 shows the camera illustrating the calculation of rolling movement.
Figure 7:
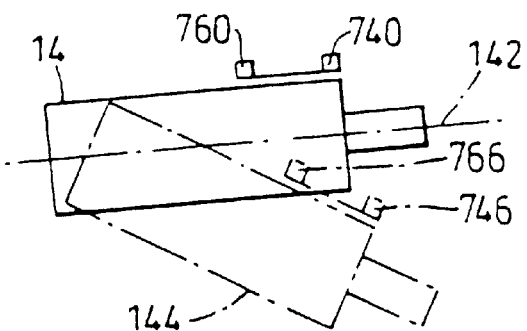
FIG. 7 shows the camera illustrating the calculation of tilting movement.

An example of use of multiple LED's is shown in FIGS. 5, 6 and 7.

In this example 3 LED's 720, 740, 760 are shown attached to the camera 14. The LED's may be attached to a plate 780 which is rigidly attached to the camera 14 so that the LED's are always in a fixed relationship with respect to the camera. The LED's may be sequentially activated and the detection by cameras 22,26 synchronised or alternatively the LED's may provide a coded output signal.

The arrangement with LED's 720, 740 and 760 is used with the two detection cameras 22, 26 as depicted in FIG. 3.

FIG. 5 shows the camera in plan view and illustrates the effect of panning the camera in the direction of arrow 800, the panned position of the camera being shown dotted and referenced as 140.

The position of the LED's through static with respect to the camera 14, 140 will change relative to the detection cameras 22, 26 and will be in positions indicated at 722, 742 and 762 with the plate 780 now in position 782. Thus, the detector cameras 22, 26 and associated processing circuitry will be able to calculate any panning movement of the camera in addition to the cameras x,y and z position.

With reference to FIG. 6, the camera 14 is shown in two positions, the second position being as a result of the camera being rolled in the direction of arrow 802 on its longitudinal axis 142 (see FIG. 7). In this second position the plate 780 will be in position 784 (shown dotted). The LED's 720 740 and 760 will be in positions 724, 744 and 764.

When viewed by detector cameras 22, 26 the position of LED's 720, 740 and 760 will vary when in positions 724, 744 and 764 relative to the cameras 22, 26 even though these LED's stay in a fixed position with respect to the camera 14. Thus, the roll of the camera can be measured by the use of the three LED's 720, 740, 760 and the two cameras 22, 26.

Similarly, with reference to FIG. 7, the camera 14 is shown in a first position and (dotted) in a tilted position 144.

It is noted that in the configuration shown in this view, LED 720 is not visible as it is behind LED 760.

When camera 14 is tilted to position 144 LED's 740, 760 (and 720 not shown) assume positions 746, 766 (and 726) and these new positions are detectable by cameras 22 and 26 and therefore the angle of tilt of camera 14 is also detectable.

The positions of LED's 720, 740 and 760 are not critical but they must be at positions which are visible to cameras 22, 26, preferably in all positions of camera 14. Also, they must be a reasonable distance apart so as to be distinguishable by the detector cameras 11, 26.

By monitoring the three (or more) LED on the camera 14 the necessity for a patterned panel is removed because the pan, tilt and roll can be measured as well as the x, y and z positions of the camera.

All that is then required is for a measurement of the zoom-focus. This can be obtained by the use of zoom-focus sensors which read and transmit the information in synchronised mode to the TV vertical sync. This information is read into the control unit 46 and thus the system can be operated with a solid uni-color chroma-key panel and with a shoulder mounted camera.

In the case that a studio camera mounted on a rigid pan and tilt head, it is sufficient to have two LED's (e.g. 720 and 740) measuring pan and tilt position because the roll angle is fixed and can be measured at the beginning.

What is claimed is:

1. A virtual studio positioning system comprising:
   a chroma-key background panel,
   a television camera situated in a defined front studio area in front of the chroma-key background panel for imaging a foreground object in front of the chroma-key background panel,
   at least one fixed mounted detection unit, said at least one fixed mounted detection unit having a field of view to cover the defined front studio area,
   an emitting device mounted in a fixed relationship with respect to the television camera or foreground object, said at least one fixed mounted detection unit receiving emissions from said emitting device and producing a detection output signal,
   a processor for processing the detection output signal of the at least one fixed mounted detection unit to provide at least x and y co-ordinates for the television camera or foreground object in relation to a position thereof in the defined front studio area, and
   a defined structure of at least three light emitting diodes (LEDs) positioned in a fixed relationship with respect to the television camera to enable calculation of camera parameters x, y, z, pan, tilt and roll by said processor in response to detection of the light emitted by said at least three LEDs.

2. The virtual studio positioning system of claim 1 further including a zoom-focus sensor attached to said television camera, the system enabling the use of a uni-color background panel for displaying a virtual background.

3. The virtual studio positioning system of claim 1 in which the chroma-key background panel comprises a coded chroma-key panel, the processor processing data extracted from said coded chroma-key panel, and zoom-focus information provided from the coded chroma-key panel.

4. The virtual studio positioning system of claim 3 in which the at least one fixed mounted detection unit is a static camera, also sensitive to the non visible part of the electromagnetic spectrum emitted by said at least three LEDs.

5. The virtual studio positioning system of claim 4 in which the emitting device is an LED, and the LED and the static camera operate in the near infra-red.

6. The virtual studio positioning system of claim 3 in which the detection output signal from said emitting device is used to constrain the processing by the processor to provide more accurate perspective transformation.

7. The virtual studio positioning system of claim 1 in which the emitting device is an LED, operating in the non visible part of the electromagnetic spectrum.

8. The virtual studio positioning system of claim 1 in which the emitting device is an LED, said LED being not on continuously but being switched on for a defined time period.

9. The virtual studio positioning system of claim 8 in which the at least one fixed mounted detection unit is also gated to receive emissions during a further defined period which is synchronous to the defined time period.

10. The virtual studio positioning system of claim 9 in which the defined time period is shorter than the further defined time period and both periods are synchronized to a frame synchronization of the television camera.

11. The virtual studio positioning system of claim 9 which the LED is active for a period of approximately 200 $\mu$sec and the at least one fixed mounted detection unit is active for a period of 100 $\mu$sec.

12. The virtual studio positioning system of claim 1 in which the emitting device is an LED having an output that comprises a coded emission. period which is synchronous to the defined time period.

13. The virtual studio positioning system of claim 1 in which the at least one fixed mounted detection unit is mounted at a height above the chroma-key background panel.

14. The virtual studio positioning system of claim 1 further comprising a second fixed mounted detection unit.

15. The virtual studio positioning system of claim 14 further comprising means for triangulating the positions given by the first mentioned fixed mounted detection unit and the second fixed mounted detection unit to determine the x, y, and z positions of the television camera or the foreground object.

16. A position sensing system for a television studio having a camera, the system comprising:

- an emission device mounted on an object in a defined area, the emission device emitting non-continuous radiation only in pulses of defined width within the near infra-red,
- a detector for detecting the non-continuous radiation emitted by said emission device and providing an output signal,
- a processor for processing the output signal of the detector to provide an x, y positional map of the object within the defined area, and
- a defined structure of at least three light emitting diodes (LEDs) positioned in a fixed relationship with respect to the camera to enable calculation of camera parameters x, y, z pan, tilt and roll by said processor in response to detection of the light emitted by said at least three LEDs, and
- the detector including a spectral filter for collecting only radiation in the emission spectrum of the emission device, and a temporal filter for collecting radiation only within a defined time period, said defined time period being synchronized to the pulses emitted by the emission device.

* * * * *

UNITED STATES PATENT AND TRADEMARK OFFICE
CERTIFICATE OF CORRECTION

PATENT NO. : 6,438,508 B2
DATED : August 20, 2002
INVENTOR(S) : Michael Tamir and Avi Sharir It is certified that error appears in the above-identified patent and that said Letters Patent is hereby corrected as shown below:

Column 1,
Line 59, replace "used," with -- used --.

Column 4,
Line 42, replace "2" with -- z --.

Column 6,
Line 64, after "9" insert -- in --.

Column 7,
Lines 3-4, delete "period which is a synchronous to the defined time period".

Signed and Sealed this

Twenty-fifth Day of March, 2003

JAMES E. ROGAN
*Director of the United States Patent and Trademark Office*